United States Patent
Vaidya et al.

(10) Patent No.: US 9,385,773 B2
(45) Date of Patent: Jul. 5, 2016

(54) TRAFFIC TUNNEL FOR END TO END LOW LATENCY

(71) Applicant: Broadcom Corporation, Irvine, CA (US)

(72) Inventors: Harish Vaidya, Bangalore (IN); Sriram Neelakandan, Bangalore (IN); Rakesh Raman, Bangalore (IN); Gireesh Hegde, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 43 days.

(21) Appl. No.: 13/925,021

(22) Filed: Jun. 24, 2013

(65) Prior Publication Data

US 2014/0369246 A1 Dec. 18, 2014

Related U.S. Application Data

(60) Provisional application No. 61/835,103, filed on Jun. 14, 2013.

(51) Int. Cl.
*G08C 17/00* (2006.01)
*H04B 1/40* (2015.01)
*H04L 29/06* (2006.01)

(52) U.S. Cl.
CPC . *H04B 1/40* (2013.01); *H04L 69/16* (2013.01)

(58) Field of Classification Search
CPC ...... H04W 40/00; H04W 4/008; H04L 69/16; H04L 47/24
USPC ........................................... 455/574; 370/329
See application file for complete search history.

(56) References Cited

U.S. PATENT DOCUMENTS

| | | | |
|---|---|---|---|
| 2008/0062918 A1 | 3/2008 | Ibrahim et al. | |
| 2008/0192666 A1* | 8/2008 | Koskan et al. | 370/311 |
| 2011/0090865 A1 | 4/2011 | Lerzer et al. | |
| 2012/0120811 A1 | 5/2012 | Varadhan et al. | |
| 2012/0120934 A1* | 5/2012 | Cho | 370/338 |
| 2013/0114540 A1* | 5/2013 | Ding et al. | 370/329 |
| 2013/0242843 A1* | 9/2013 | Kojima | 370/312 |
| 2013/0308597 A1* | 11/2013 | Murphy et al. | 370/331 |
| 2013/0332586 A1* | 12/2013 | Masputra et al. | 709/220 |

* cited by examiner

*Primary Examiner* — Shaq Taha
(74) *Attorney, Agent, or Firm* — Brinks Gilson & Lione

(57) ABSTRACT

A communication circuitry includes a media access control including a first wireless interface and a second wireless interface. An application processor includes a network stack connected with the media access control. A communication packet is routed from the first wireless interface to the second wireless interface or from the second wireless interface to the first wireless interface without sending the communication packet to the network stack.

18 Claims, 4 Drawing Sheets

TRAFFIC TUNNEL FOR END TO END LOW LATENCY

PRIORITY CLAIM

This application claims priority to U.S. Provisional Application Ser. No. 61/835,103, filed Jun. 14, 2013, which is incorporated herein by reference in its entirety.

TECHNICAL FIELD

This disclosure relates to a wireless network, and to a traffic tunnel for end-to-end low latency in the wireless network.

BACKGROUND

Multi-interface functions for Institute of Electrical and Electronics Engineers (IEEE) 802.11 wireless local area network (WLAN) capable devices are becoming more common in mobile, tablet, netbooks and laptop computers WiFi devices. The WiFi devices may connect to a main network in infrastructure mode and another network interface may be needed to transfer or share content between WiFi devices, without connecting to a wireless access point of the WLAN. Standards such as WiFiDirect provide mechanisms for communicating between WiFi devices.

BRIEF DESCRIPTION OF THE DRAWINGS

The innovation may be better understood with reference to the following drawings and description. In the figures, like reference numerals can designate corresponding parts throughout the different views.

DETAILED DESCRIPTION

The discussion makes reference to methods and apparatuses for implementing a traffic tunnel. The traffic tunnel can achieve end-to-end low latency in virtual or real simultaneous dual band mode and power save capability in IEEE 802.11 multi-interface devices, single stream (SISO) and multiple-input and multiple-output (MIMO) wireless devices. For the wireless communication devices to participate in wireless communications, the traffic tunnel can avoid utilizing a host processor, a network stack and/or a host wireless driver. The data modulation stage (baseband process) converts between data and baseband signals in accordance with the determined wireless communication standard. The RF stage, transmitter section and receiver section, converts between baseband signals and RF signals. Whether the RF stage is a direct conversion transceiver that converts directly between baseband and RF or includes one or more intermediate frequency stages, power is consumed. By powering down, completely or partially, processors and/or drivers in determined situations, power can be saved.

Figure 1:
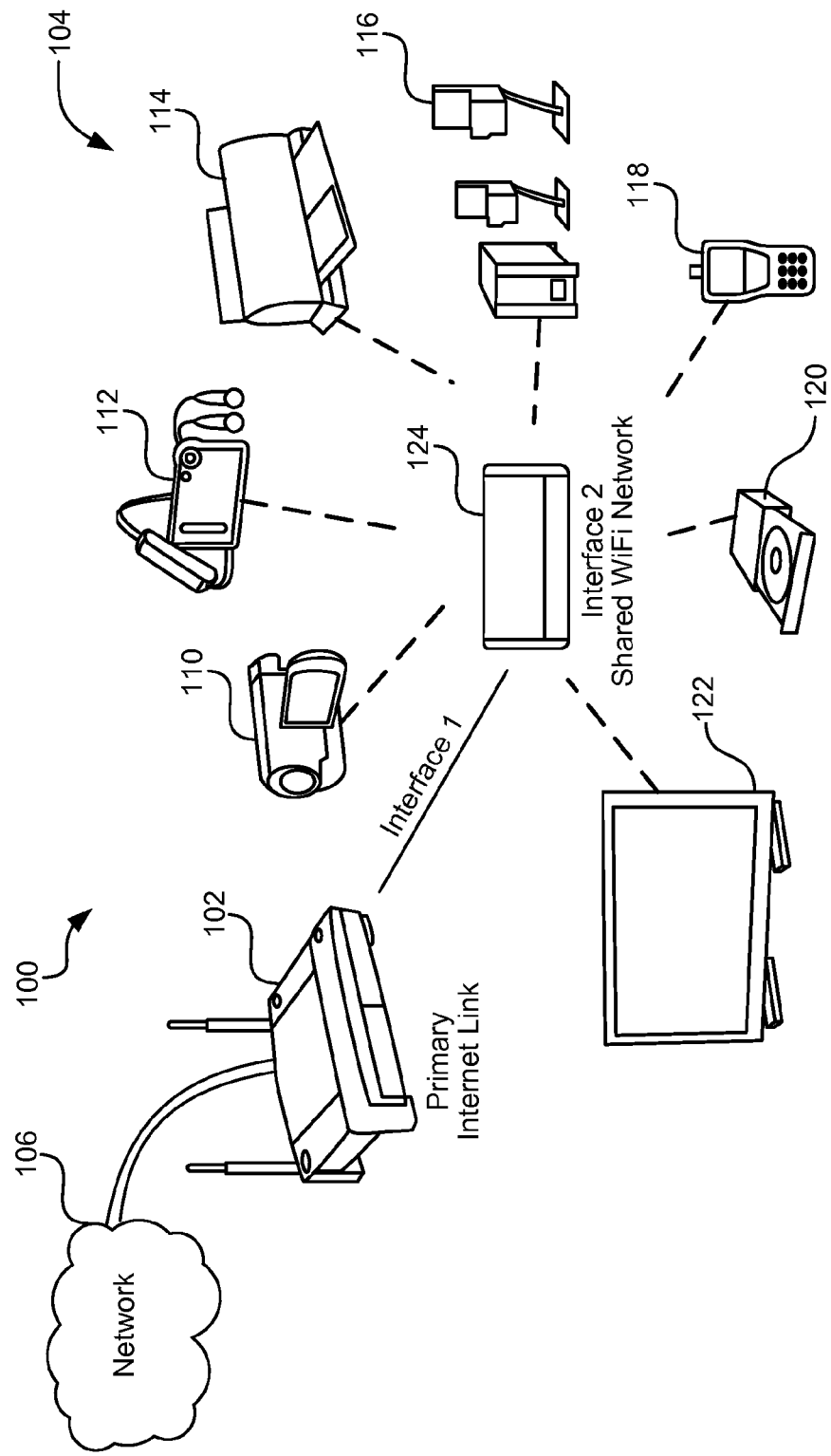
FIG. 1 is a block diagram of an exemplary wireless network.

FIG. 1 is a block diagram of an exemplary communication network 100. Aspects of the communication network 100, e.g., WiFi and wireless local area network (WLAN), may include dual-or-single band multi-interface IEEE 802.11 wireless devices, present in any network enabled device 104, e.g., a wireless access point (WAP) 102, including Soft-AP/Hot-Spot, connected to the Internet or other wide area network (WAN) 106 via IEEE 802.3 Ethernet, and other wireless enabled devices 104 on the communication network 100. Exemplary devices 104 can be a camcorder 110, a music player 112, a printer 114, a stereo 116, a two-way radio 118, a video player 120, a television 122 and a mobile device 124, e.g., smart phone, tablet, etc. In other implementations, the mobile device 124 can be a stationary device that works with the schemes discussed herein.

The IEEE 802.11 wireless network can use the WAP 102 for the communications infrastructure. A communication device such as the mobile device 124 connects to the WAP 102 for Internet connectivity and the other wireless enabled devices 110-122 can connect to the mobile device 124 via the WLAN. Therefore, the mobile device 124 can create an IEEE 802.11 local wireless network to share content with the other devices 110-122 in the network. For instance, a user can watch his favorite show on the mobile device 124, and push the show to the television 122 via the wireless network.

Figure 2:
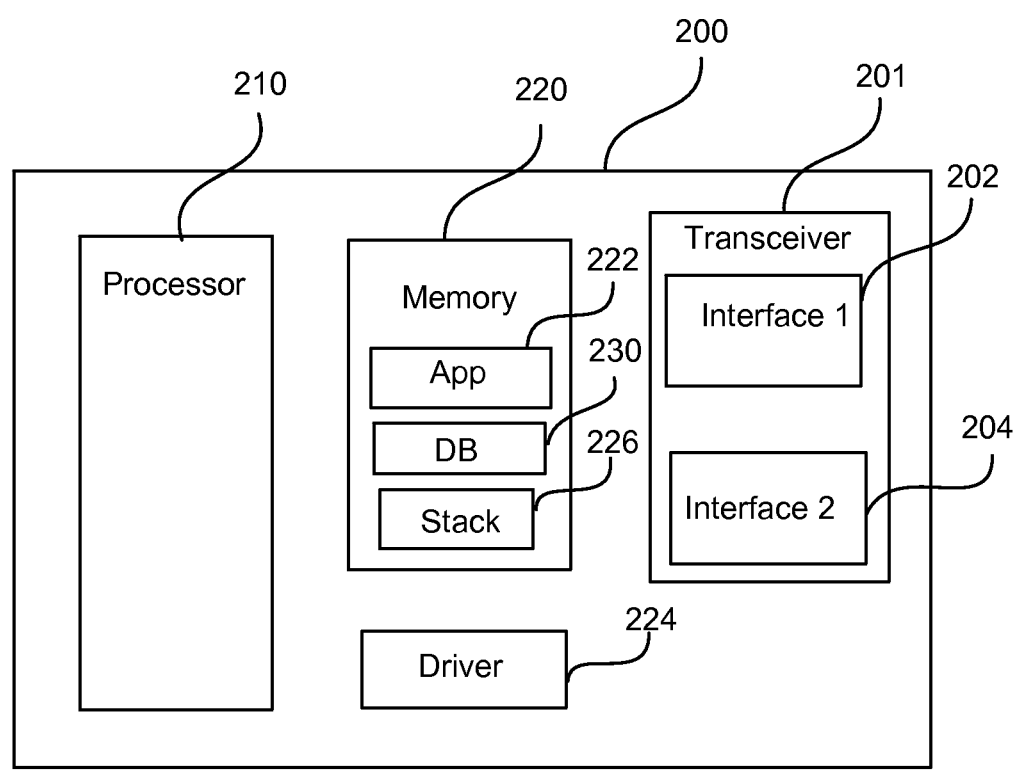
FIG. 2 is a block diagram of an exemplary control circuitry for the mobile device.

FIG. 2 is a block diagram of an exemplary control circuitry 200 for the mobile device 124. A wireless device driver 224 of the control circuitry 200 controls the transceiver 201 and provides a network interface which can be a logical representation of the transceiver 201. The network interface can be a first interface 202 and a second interface 204 using two radios (dual-band) or virtual interface emulation on a single radio. A host processor 210 can execute programs stored in a memory 220, including application logic 222. The memory can also include an OS network stack 226 and an interface database (DB) 230, as described in more detail below. The device driver 224 can drive the dual radio transceiver 201, and power down the host processor 210 when not needed during routing of communication packets from the first interface 202 to the second interface 204 of the transceiver 201 or from the second interface 204 to the first interface 202 of the transceiver.

The circuitry 200 can support routing directly between the first interface 202 and the second interface 204, e.g., for sharing data across IEEE 802.11 wireless networks. For example, the first interface 202 is used to wirelessly connect to the Internet using the WAP 102 and the second interface 204 is used to create the local WLAN network to share the contents of the mobile device 124 with the other devices 110-122. Additionally or alternatively, a connection to the first interface 202 and/or the second interface 204 may be a wired connection. The device driver 224 can include a L3 packet forward database 230 for storing instructions to accommodate tunnel traffic between the first interface 202 and the second interface 204.

As discussed more below, network packets are sent directly from the first interface 202 to the second interface 204, e.g., to achieve end-to-end low latency in virtual or real simultaneous dual band mode and power save capability in IEEE 802.11 multi-interface devices. The network packets from the first interface 202 need not be converted from IEEE 802.11 to IEEE 802.3 Ethernet packets and submitted to the OS network stack 226. Additionally or alternatively, the OS network stack 226 need not handle the routing decisions based on L3/IP-forwarding and forwards packets to the second interface 204. Additionally or alternatively, the packets need not be converted again from IEEE 802.3 to IEEE 802.11 to be transmitted wirelessly to the devices 110-122. Therefore, latencies when moving data between first interface 202 and the second interface 204 can be reduced. If data is not forwarded between interfaces 202, 204 via the OS network stack 226, the host wireless driver 224 need not be interrupted on a per packet basis.

To complete a communication connection between the wireless communication devices, e.g., devices 110-124, the associated base stations and/or associated access points, e.g., access point 102 can communicate with each other directly, via a system controller, via the public switch telephone network, via the Internet, and/or via some other wide area network.

Figure 3:
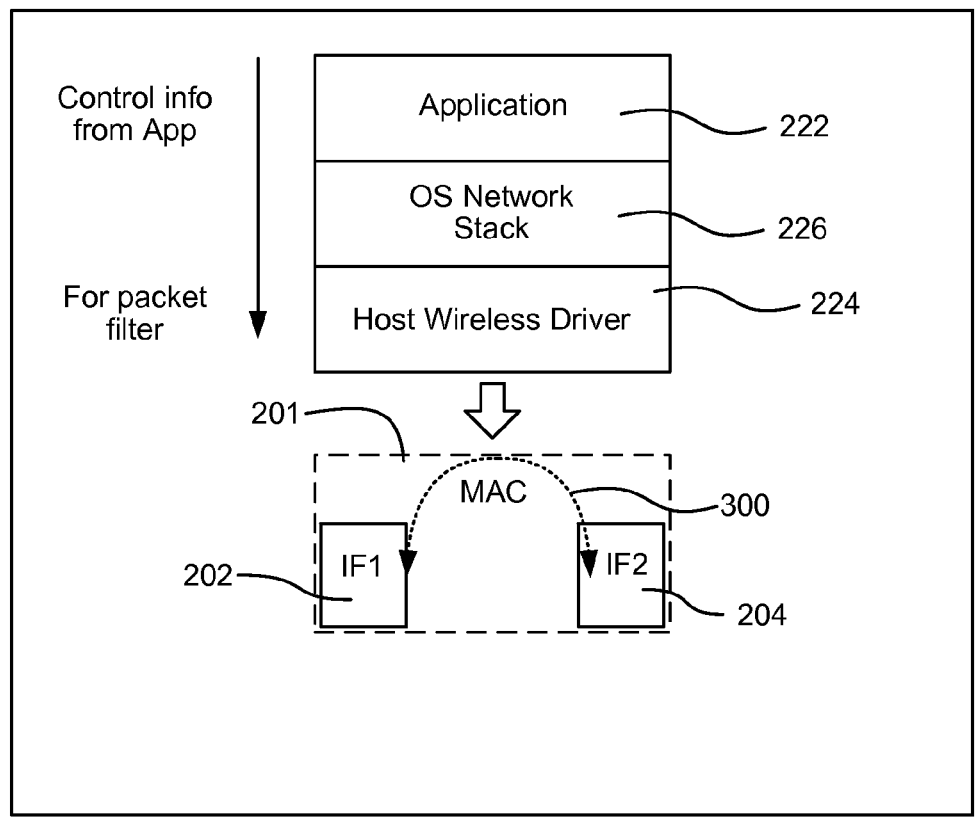
FIG. 3 is a block diagram of an exemplary packet processing in a wireless network stack.

FIG. 3 is a block diagram of an exemplary packet processing in the wireless OS network stack 226. An exemplary use-case may include a communication device, e.g., the mobile device 124 that has Internet connectivity and shares its content, e.g., audio, image, text and/or video, with one or more WiFi enabled devices, e.g., devices 110-122. When the mobile device 124 can share Internet content with other 802.11 Wi-Fi network devices 110-122, it can reduce packet latency and save the battery power using a traffic tunnel 300. The traffic tunnel 300 is created between the first interface 202 and the second interface 204 at the MAC layer in the wireless device 124. This reduces overhead and reduces routing latency for the packet through the resident operating system (OS). Packets do not have to reach the OS layers host wireless driver 224 and OS network stack 226 before they get routed from the first interface 202 to the second interface 204. Therefore, low-latency and saved power may be achieved. The scheme may also save battery life as the processor 210 and the OS can encounter fewer network interface interrupts.

Using the tunnel schemes, the communication system 100 can support wireless and wire-line communications between wireless and/or wire-line communication devices, e.g. devices 110-122. The communication system 100 can range from national and/or international mobile/handheld systems to the point-to-point gaming, in-home wireless networks, audio and video wireless devices. The communication system 100 can operate in accordance with one or more communication standards. For example, wired communication systems may operate according to one or more versions of the Ethernet standard, the System Packet Interface (SPI) standard, secure digital input/output SDIO or various other standards. Wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of communication system 100, a wireless communication device, e.g., a cellular telephone, two-way radio, personal digital assistant (PDA), personal computer (PC), laptop computer, satellite phone, home entertainment equipment, etc. communicates directly or indirectly with other wireless communication devices, e.g., without being routed to the OS stack 226. For direct communications, e.g., point-to-point communications, the participating wireless communication devices can tune their receivers and transmitters to the same channel or channels, e.g., one of various radio frequency (RF) carriers of the wireless communication system, and communicate over that channel or channels. For indirect wireless communications, wireless communication devices can communicate directly with an associated base station, e.g., for cellular services, and/or an associated access point, e.g., for an in-home or in-building wireless network, via an assigned channel.

It can be advantageous to implement these schemes to reduce battery power and extend battery life. Wireless communication devices, particularly small handheld devices and netbooks are limited to what components reside in them. For example, cell phones and portable, down-loadable music players can have compact electronics packaged in them. These devices are mobile in nature and often battery powered. It is may be inconvenient for the mobile users to return frequently to a power source. Wireless applications can require longer battery life without sacrificing connectivity. Using this scheme, the transceiver 201 can be powered down during flow of the communication packets from the first interface 202 to the second interface 204. Powering down drivers and processors that drive the transceiver 201 using the schemes discussed here can lead to power savings.

Figure 4:
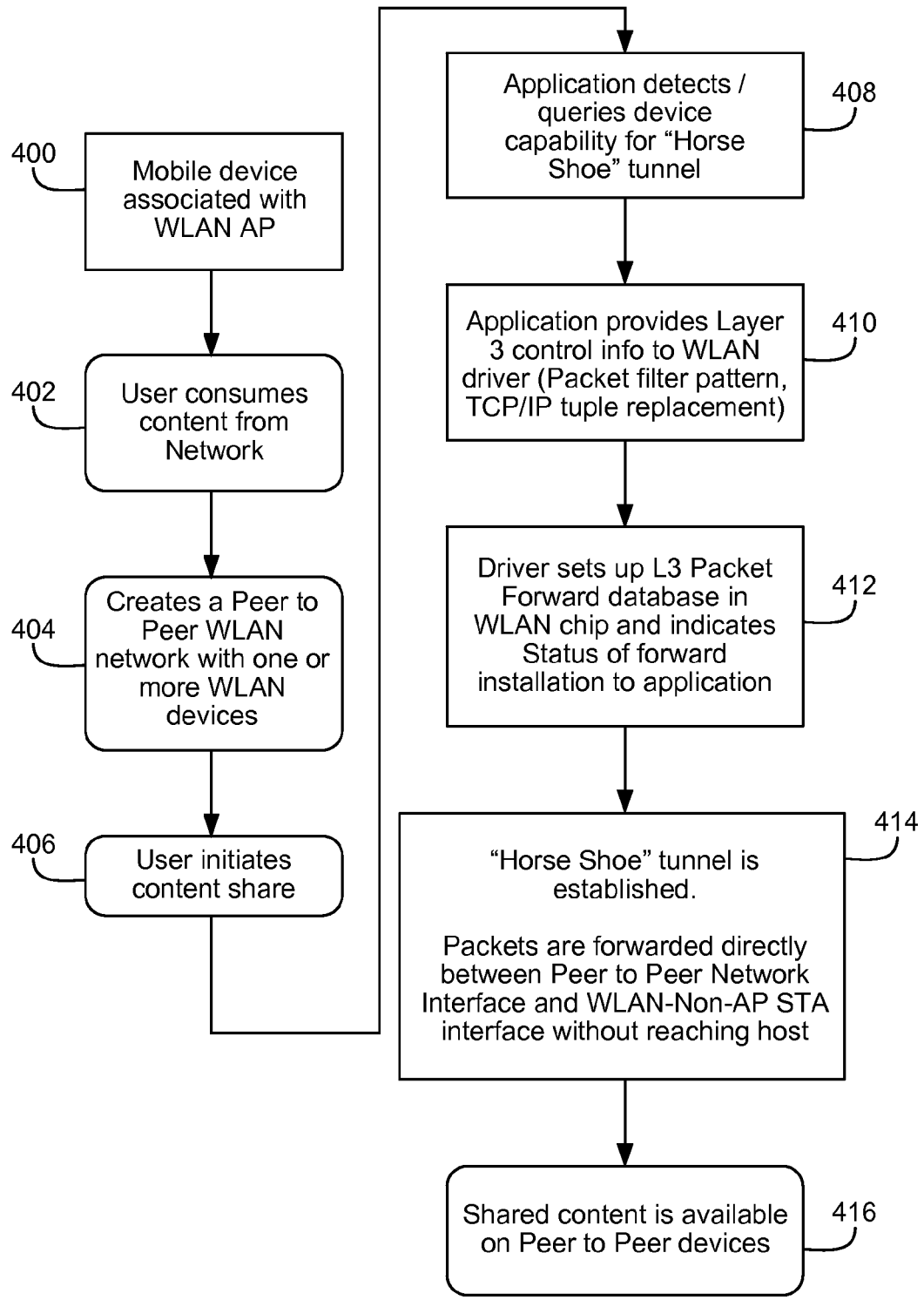
FIG. 4 is a flow chart of an exemplary application for sharing content between peer-to-peer devices.

FIG. 4 is a flow chart of an exemplary application for sharing content between peer-to-peer devices 110-124. The first interface 202 of the mobile device 124 is associated with a WAP 102 (400). Since the WAP 102 connects with a network, e.g., the Internet, the communication device can receive content from the network for the user to consume on the mobile device 124 (402). The second interface 204 of the mobile device 124 creates a peer-to-peer WLAN, Independent Basic Service Set (ibss) and/or other intercommunication network with one or more WLAN devices 110-122, e.g., television 122 (404). The mobile device 124 can initiate content sharing (406). The mobile device 124 can detect and/or query WLAN devices 110-122 to connect to via traffic tunnel 300 (408). The application provides Layer 3 control information to the WLAN driver 224 of the mobile device 124, e.g., packet filter pattern, TCP/IP tuple replacement, etc. (410). The WLAN driver 224 establishes the L3 packet forward database 230 in the WLAN driver chip and indicates a status of forward installation to the application (412). A tunnel is established between the first interface 202 and the second interface 204 of the mobile device 124. Communication packets are forwarded directly between the first interface 202, e.g., peer-to-peer network interface, and the second interface 204, e.g., WLAN-non-AP STA interface, without reaching the host driver 224 (414). Shared content is available on the peer-to-peer devices (416).

Therefore, when the wireless driver 224 provides the infrastructure for more than one wireless interface, it can provide additionally a control interface (ioctl) to enable traffic tunneling at the MAC layer in the wireless device. This can be a small packet-forward database implemented in the wireless driver 224. The application can provide the required L3-packet-filter criteria, and modifications required on the packet. The wireless driver can perform the per-packet filter match, based on the filter-criteria provided by the application, and concludes if the packet is to be routed to the other wireless interface or moved up the network stack to the application processor. When the wireless driver sends the communication packet directly from the first interface to the second interface, it can create a horse shoe tunnel at MAC layer to prevent the packets from going up the network stack. This tunnel helps reduce packet latency and helps in saving battery power since interrupts are not provided to the application processor and packets are not processed by the application processor's network stack. Real time traffic can move between the first interface and the second interface without reaching upper OS layers. This can achieve low latency in real time video applications in wireless implementation.

While various embodiments have been described, many more embodiments and implementations are possible. Accordingly, the description is not to be restricted.

What is claimed is:

1. A communication circuitry included in a wireless device, comprising:
   a transceiver comprising a media access control layer and including a first interface and a second interface; and
   an application processor including a network stack in communication with the media access control layer;
   a device driver configured to create a traffic tunnel at the media access control layer within the transceiver, the device driver configured to receive control information from an application, the control information providing a per packet filter criteria for determination, by the device driver based on the per packet filter criteria, whether to route a communication packet from the first interface to the second interface or from the second interface to the first interface, through the traffic tunnel;
   wherein the communication packet is routed from the first interface to the second interface, or from the second interface to the first interface within the traffic tunnel created at the media access control layer to exclude the communication packet from being processed by the network stack.

2. The communication circuitry of claim 1, where the media access control layer does not send an interrupt to the application processor.

3. The communication circuitry of claim 1, where the first interface connects with a wireless access point and the second interface connects with a wireless device.

4. The communication circuitry of claim 1, further including a database to store instructions to send communication packets from the first interface to the second interface or the second interface to the first interface.

5. The communication circuitry of claim 1, where the first interface establishes a connection with the Internet and the second connection establishes a wireless local area network.

6. The communication circuitry of claim 1, where a host processor is powered down during routing of the communication packet from the first interface to the second interface of the transceiver or from the second interface to the first interface of the transceiver since the communication packet does not reach the host processor or the network stack.

7. A method, comprising:
   creating a traffic tunnel in a media access control layer between a first interface and a second interface of a wireless device;
   receiving control information from an application, the control information providing a per packet filter criteria;
   determining, based on the per packet filter criteria, whether to route a communication packet from the first interface to the second interface or from the second interface to the first interface, through the traffic tunnel;
   controlling in a wireless driver of the wireless device the first interface to send a communication packet directly to the second interface through the traffic tunnel in the media access control layer of the wireless device so as to bypass processing by a network stack included in the wireless device.

8. The method of claim 7, further including powering down a host processor while sending the communication packet from the first interface to the second interface since the communication packet stays in the communication tunnel and does not leave the media access control layer.

9. The method of claim 7, where the first interface connects with a wide area network and the second interface connects with a local area network.

10. A communication device, comprising:
    a driver including a first interface and a second interface, the driver configured to receive control information from an application, the control information comprising a per packet filter criteria; and
    a network stack connected with the driver, the network stack configured to control a flow of communication packets between a wide area network and the driver; and
    the driver configured to create a communication tunnel in a media access control layer of the communication device and control a flow of communication packets directly from the first interface to the second interface through the communication tunnel to preclude involvement of the network stack, wherein control of the flow of communication packets directly from the first interface to the second interface through the communication tunnel is based on the per packet filter criteria.

11. The communication device of claim 10, where the first interface connects with the wide area network via an access point and the second interface connects with a local area network.

12. The communication device of claim 11, where the local area network comprises WiFi.

13. The communication device of claim 10, where a host processor is powered down during routing of the communication packet from the first interface to the second interface since the communication packet does not reach the network stack.

14. The communication circuitry of claim 1, where the communication packet is routed directly between the first interface and the second interface.

15. The communication circuitry of claim 1, where the communication packet is routed in the traffic tunnel to prevent the communication packet from reaching the network stack.

16. The communication circuitry of claim 15, where the traffic tunnel is maintained completely within the media access control (MAC) layer.

17. The communication circuitry of claim 15, wherein a portion of the communication circuitry, comprising the application processor including the network stack is powered down during routing of the communication packet from the first interface to the second interface of the transceiver or from the second interface to the first interface of the transceiver.

18. The method of claim 7, further comprising powering down the wireless driver of the wireless device while the communication packet is being sent to the second interface through the traffic tunnel since the communication packet does not reach the wireless driver.

* * * * *